(12) United States Patent
Reily et al.

(10) Patent No.: US 11,593,065 B2
(45) Date of Patent: Feb. 28, 2023

(54) METHODS AND SYSTEMS FOR GENERATING CUSTOMIZED AUDIO EXPERIENCES

(71) Applicant: Bose Corporation, Framingham, MA (US)

(72) Inventors: Todd R. Reily, North Reading, MA (US); Daniel Buckley, Newton, MA (US); Jayme Anne McCreary, Boston, MA (US); Felix Daniel Izarra, Framingham, MA (US); Conor William Sheehan, Natick, MA (US); Matthew Evan Leon, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/402,420

(22) Filed: Aug. 13, 2021

(65) Prior Publication Data

US 2021/0373848 A1    Dec. 2, 2021

Related U.S. Application Data

(63) Continuation of application No. PCT/US2020/018119, filed on Feb. 13, 2020, which is a continuation of application No. 16/788,974, filed on Feb. 12, 2020, now Pat. No. 10,983,752.

(60) Provisional application No. 62/806,388, filed on Feb. 15, 2019.

(51) Int. Cl.
*G06F 3/16*      (2006.01)
*G06F 3/0482*   (2013.01)
*G10K 11/16*    (2006.01)

(52) U.S. Cl.
CPC ............ *G06F 3/165* (2013.01); *G06F 3/0482* (2013.01); *G06F 3/167* (2013.01); *G10K 11/16* (2013.01)

(58) Field of Classification Search
CPC ........ G06F 3/165; G06F 3/0482; G06F 3/167; G10K 11/16
See application file for complete search history.

(56) References Cited

U.S. PATENT DOCUMENTS

| 2016/0125869 A1* | 5/2016 | Kulavik | H04S 7/00 |
| | | | 381/71.1 |
| 2016/0203343 A1* | 7/2016 | Soffer | G06F 13/4068 |
| | | | 726/34 |
| 2017/0251295 A1* | 8/2017 | Pergament | A61B 5/4809 |

* cited by examiner

*Primary Examiner* — Fan S Tsang
*Assistant Examiner* — David Siegel

(57) ABSTRACT

Methods for providing a customized audio experience to a user of an audio output device are provided. A user interface is provided on a user device communicatively coupled to the audio output device, the user interface capable of accepting user input for managing the audio experience for the user. A set of activities is provided via the user interface, wherein each activity in the set invokes a set of behaviors configured for the activity for providing the customized audio experience to the user, wherein each behavior in the set customizes the audio experience for the user. A capability is provided via the user interface for the user to launch an activity from the set for invoking the set of behaviors configured for the activity to receive the customized audio experience.

20 Claims, 5 Drawing Sheets

METHODS AND SYSTEMS FOR GENERATING CUSTOMIZED AUDIO EXPERIENCES

RELATED APPLICATIONS

This application is a continuation application and claims benefit of International Application No. PCT/US2020/18119, filed Feb. 13, 2020, and titled "METHODS AND SYSTEMS FOR GENERATING CUSTOMIZED AUDIO EXPERIENCES", which was an international application filing of and claimed priority to U.S. patent application Ser. No. 16/788,974, filed Feb. 12, 2020, and titled "METHODS AND SYSTEMS FOR GENERATING CUSTOMIZED AUDIO EXPERIENCES" (that was patented on Apr. 20, 2021, as U.S. Pat. No. 10,983,752), which was a nonprovisional filing of and claimed priority to U.S. Provisional Patent Application Ser. No. 62/806,388, filed Feb. 15, 2019 and titled "METHODS AND SYSTEMS FOR GENERATING CUSTOMIZED AUDIO EXPERIENCES". The contents of each of the aforementioned applications are herein incorporated by reference in their entirety.

FIELD

Aspects of the disclosure generally relate to methods for providing customized audio experiences to a user of an audio output device.

BACKGROUND

Using audio output devices, such as headphones, takes effort. People make adjustments throughout their day as they move between activities and locations. The adjustments require toggling through various interfaces on the headphones and/or and user device in communication with the headphones.

Audio output devices provide a user access to several technologies designed to improve the audio experience of the user. Examples of these technologies include, but are not limited to, sound management technologies such as active noise cancelling, noise masking, noise volume control, and other technologies including geolocation technology, audio voice assistants, etc. In addition, the user may have access, for example via a user device such as a smartphone, to audio content and services such as internet audio streaming services, audio Augmented Reality (AR) content, noise masking sounds, and other third party services providing different types of audio content to the user. A user may become overwhelmed with the options and features provided by the audio output devices.

It may be desirable for the user to have convenient, personalized methods to use these technologies and audio content and services available to the user for a better audio experience and a better overall user experience.

SUMMARY

All examples and features mentioned herein can be combined in any technically possible manner.

Aspects of the present disclosure provide a method for providing a customized audio experience to a user of an audio output device. The method generally includes providing a user interface on a user device communicatively coupled to the audio output device, the user interface capable of accepting user input for managing the audio experience for the user, providing via the user interface a set of activities, wherein each activity in the set invokes a set of behaviors configured for the activity for providing the customized audio experience to the user, wherein each behavior in the set customizes the audio experience for the user, and providing, via the user interface, a capability for the user to launch an activity from the set for invoking the set of behaviors configured for the activity to receive the customized audio experience.

In an aspect, the method includes providing via the user interface at least one of access to a set of sound management capabilities associated with the audio output device, access to audio content, access to a geolocation service, or access to a set of voice assistant services, wherein at least one of the set of sound management capabilities, the audio content, the geolocation service, or a voice assistant service in the set of voice assistant services is selectable via the user interface for configuring as a behavior in the set.

In an aspect, the set of sound management capabilities comprise at least one of: controlling a level of noise cancelling or a level of sound masking based on at least one of user preferences, a loudness of sounds external to the audio output device, a state of motion of the user, speech uttered in the vicinity of the audio output device, or geolocation of the audio output device, controlling one or more individual frequencies of audio content played back by the audio output device, or adapting loudness of an audio content based on a loudness of sounds external to the audio output device.

In an aspect, the audio content comprises at least one of audio stored locally on the user device, audio streams from an internet audio service, masking sounds, ambient soundscape sounds, audio Augmented Reality (AR) content, or other audio provided by third party services.

In an aspect, the method further includes providing, via the user interface, a capability for the user to create a new activity and a set of behaviors for the new activity, wherein at least one of the sound management capabilities, the audio content, the geolocation service, or a voice assistant service in the set of voice assistant services is selectable via the user interface for configuring as a behavior in the set.

In an aspect, at least one behavior configured for an activity defines a criterion for triggering the activity, wherein the method further comprises providing, via the user interface, a prompt to the user to launch the activity when the criterion for triggering the activity is met.

In an aspect, the method further comprises providing, via the user interface, at least one activity from the set as a suggested activity to the user, based on at least one of a geolocation of the audio output device, ambient noise levels, time of day, weather, user biometric input, user habits, or user preferences.

In an aspect, the method of further comprises providing a capability for the user to launch an activity from the set using the audio output device.

In an aspect, the method further comprises providing, via the user interface, a capability for the user to select one or more activities from the set for including as part of a quick launch set of activities, wherein activities from the quick launch set can be launched using the audio output device.

In an aspect, the method further comprises providing, via the user interface, a capability for the user to repurpose at least one user interface of the audio output device based on the activity.

In an aspect, the method further comprises providing, via the user interface, a capability for the user to create a prioritized list of source devices the audio output device should establish a wireless connection with based on the activity. In an aspect, the method further provides, via the user interface, a capability for the user to identify one or more sources devices the audio output device should avoid establishing a wireless connection with based on the activity.

Aspects of the present disclosure provide system for providing a customized audio experience to a user of an audio output device. The system generally includes a user device communicatively coupled to the audio output device, and the audio output device. The audio output device generally includes at least one microphone for receiving sounds external to the audio output device, an interface circuit for communicating with the user device, a processing circuit for processing the external sounds received by the at least one microphone and audio content received from the user device, based on one or more sound management techniques, and at least one electro-acoustic transducer for outputting audio. The user device generally includes a memory for storing instructions and at least one processor. The at least one processor is generally configured to execute the instructions for providing a user interface on the user device, the user interface capable of accepting user input for managing the audio experience for the user, providing via the user interface a set of activities, wherein each activity in the set invokes a set of behaviors configured for the activity for providing the customized audio experience to the user, wherein each behavior in the set customizes the audio experience for the user, and providing, via the user interface, a capability for the user to launch an activity from the set for invoking the set of behaviors configured for the activity to receive the customized audio experience via the audio output device.

In an aspect, the audio output device is configured to receive voice prompts from the user device to launch a suggested activity.

In an aspect, the audio output device is configured to select an activity for launching, based on user input to the audio output device.

In an aspect, the at least one processor is configured to provide via the user interface at least one of access to a set of sound management capabilities associated with the audio output device, access to audio content, access to a geolocation service, or access to a set of voice assistant services, wherein the at least one processor is configured to accept user input via the user interface to select at least one of the set of sound management capabilities, the audio content, the geolocation service, or a voice assistant service in the set of voice assistant services is selectable via the user interface for configuring as a behavior in the set.

In an aspect, the audio output device is configured to receive control signaling based on the set of behaviors configured for the activity, and the audio output device is configured to implement at least one sound management operation based on the received signaling.

In an aspect, the at least one processor is configured to provide via, the user interface, a capability for the user to create a prioritized list of source devices the audio output device should establish a wireless connection with based on the activity. In an aspect, the at least one processor is further configured to provide, via the user interface, a capability for the user to identify one or more sources devices the audio output device should avoid establishing a wireless connection with based on the activity.

Aspects of the present disclosure provide a computer-readable medium storing instructions which when executed by at least one processor performs a method for providing a customized audio experience to a user of an audio output device, the method generally including providing a user interface on a user device communicatively coupled to the audio output device, the user interface capable of accepting user input for managing the audio experience for the user, providing via the user interface a set of activities, wherein each activity in the set invokes a set of behaviors configured for the activity for providing the customized audio experience to the user, wherein each behavior in the set customizes the audio experience for the user, and providing, via the user interface, a capability for the user to launch an activity from the set for invoking the set of behaviors configured for the activity to receive the customized audio experience.

In an aspect, the instructions comprise instructions for providing via the user interface at least one of access to a set of sound management capabilities associated with the audio output device, access to audio content, access to a geolocation service, or access to a set of voice assistant services, wherein at least one of the set of sound management capabilities, the audio content, the geolocation service, or a voice assistant service in the set of voice assistant services is selectable via the user interface for configuring as a behavior in the set.

In an aspect, the instructions further comprise instructions for providing, via the user interface, a capability for the user to create a new activity and a set of behaviors for the new activity, wherein at least one of the sound management capabilities, the audio content, the geolocation service, or a voice assistant service in the set of voice assistant services is selectable via the user interface for configuring as a behavior in the set.

In an aspect, the instructions further comprise instructions for providing, via the user interface, a capability for the user to perform at least one of adding a new behavior to a configured activity or customizing a selected behavior for a configured activity.

In an aspect, at least one behavior configured for an activity defines a criterion for triggering the activity, wherein the instructions further comprise instructions for providing, via the user interface, a prompt to the user to launch the activity when the criterion for triggering the activity is met.

DETAILED DESCRIPTION

Aspects of the present disclosure describe techniques for providing a customized audio experience to a user of an audio output device by leveraging the technologies, audio content and services available to the user. Certain aspects describe techniques for providing easy access to the various technologies, audio content and services via a single user interface for creating, configuring and launching customized audio experiences for the user.

Figure 1:
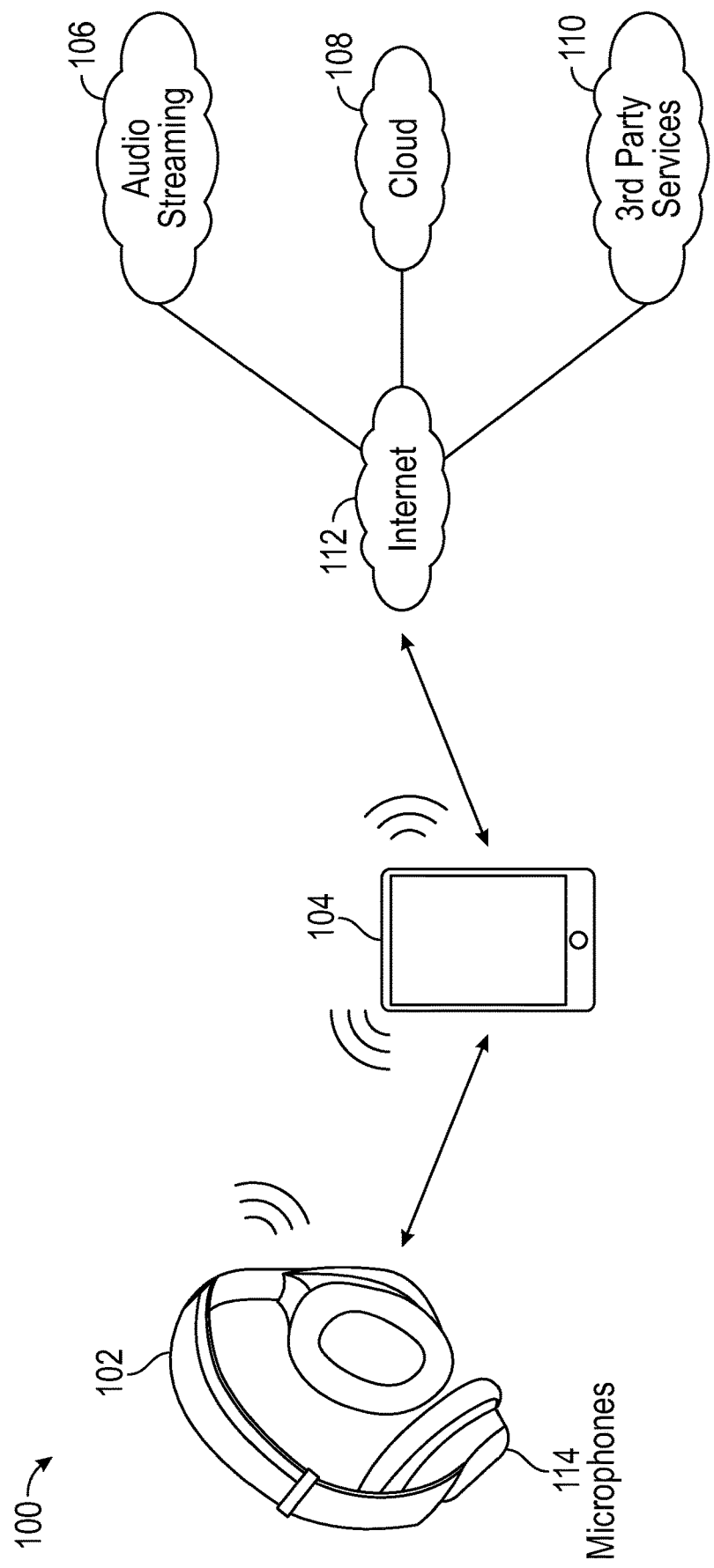
FIG. 1 illustrates an example system in which aspects of the present disclosure may be practiced.

FIG. 1 illustrates an example system 100 in which aspects of the present disclosure may be practiced.

As shown, system 100 includes a pair of headphones 102 wirelessly connected to a portable user device 104 such as a smartphone, tablet or the like. In an aspect, the wireless connection between the headphones 102 and the user device 104 may use any wireless communication method including but not limited to Bluetooth, Wi-Fi, Bluetooth Low Energy (BLE) or the like. In an aspect, the headphones 102 may be connected to the user device 104 using a wired connection. The user device 104 is also connected to the internet 112 and may access one or more services over the internet. As shown, these services may include audio streaming services 106, cloud services 108, and other third party services 110.

In certain aspects, the headphones 102, by themselves or in combination with the user device 104, provide one or more sound management capabilities. In an aspect, the sound management capabilities include controlling a level of noise cancelling or a level of sound masking based on at least one of user preferences, a loudness of sounds external to the headphones 102, a state of motion of the user, speech uttered in the vicinity of the audio output device, or a geolocation of the audio output device. Additionally or alternatively, the sound management capabilities may include controlling one or more individual frequencies of audio content played back by the headphones. Additionally or alternatively, the sound management capabilities may include adapting loudness of an audio content based on a loudness of sounds external to the headphones.

In an aspect, the headphones 102 include hardware devices and circuitry to implement one or more of the sound management capabilities. For example, the headphones 102 include at least one of: one or more microphones 114, noise cancelling circuitry (not shown), sound masking circuitry (not shown), movement detecting devices and circuitry (e.g., accelerometer, gyroscope, magnetometer, etc.), geolocation circuitry, one or more cameras, one or more sensors configured to collect biologically-relevant information (PPG, EEG, etc.), and other sound processing circuitry. In an aspect, the one or more microphones 114 are configured to receive sounds external to the headphones 102. The noise cancelling circuitry is configured to reduce unwanted ambient sounds external to the headphones 102 by using active noise cancelling. The sound masking circuitry is configured to reduce distractions by playing masking sounds via the speakers of the headphones 102. The movement detecting circuitry is configured to use devices such as an accelerometer, gyroscope, magnetometer, or the like to detect whether the user wearing the headphones is moving (e.g., walking, running etc.) or is at rest and/or the direction the user is looking or facing. The movement detecting circuitry may also be configured to detect a head position of the user for use in augmented reality (AR) applications where an AR sound is played back based on which way the user is looking. The geolocation circuitry may be configured to detect a physical location of the user wearing the headphones. For example, the geolocation circuitry includes Global Positioning System (GPS) antenna and related circuitry to determine GPS coordinates of the user. The one or more sensors may be configured to collect biologically-relevant information associated with the user. Examples include sensors configured to approximate a user's heart rate, respiration rate, eye movement, galvanic skin response, etc. In aspects, one or more sensors are disposed on the headphones 102, the user device 104, or a device in communication with the headphones 102 and user device 104.

In an aspect, one of the sound management capabilities includes controlling the level of noise cancelling and/or noise masking as a function of external sound/noise levels. For example, the headphones 102 continually monitor and/or receive noise external to the headphones 102 while the user wearing the headphones is walking through a downtown area of a city. The received external noise is processed in real time by the sound processing circuitry in the headphones 102 to continually monitor and measure sound energy levels of the detected noise. The noise cancelling circuitry or the noise masking circuitry (depending on whether the user is using noise canceling or noise masking) may be controlled to change a level of noise cancelling or noise masking as a function of the external sound energies. For example, the noise cancelling or noise masking levels may be configured to increase as the external noise levels increase. On the other hand, the noise cancelling or noise masking levels may be configured to decrease as the external noise levels decrease. Such a noise cancellation system is described in U.S. patent application Ser. No. 16/124,056, entitled "Compressive Hear-through in Personal Acoustic Devices, filed on Sep. 6, 2018, the entire contents of which are incorporated herein by reference.

In an aspect, one of the sound management capabilities includes setting a loudness of sounds external to the headphones 102 based on user preferences. For example, the user may select a volume level of external sounds. In an aspect, to implement the user selected volume of external sounds, the external sounds may be received by the headphone's microphones 114 and played by the headphone speakers at the desired volume.

In an aspect, one of the sound management capabilities includes controlling the level of noise cancelling and/or noise masking as a function of user movement. For example, the movement detection circuitry may detect whether the user is moving or is at rest. The noise cancelling circuitry or the noise masking circuitry (depending on whether the user is using noise canceling or noise masking) may be configured to apply noise cancelling or noise masking at maximum levels when the user is at rest so that the user is not bothered by external noise. On the other hand, for safety reasons, the noise cancelling or the noise masking levels may be configured to decrease in response to detecting that the user is moving (e.g., walking or running) so that the user is more aware of his/her surroundings.

In an aspect, one of the sound management capabilities includes controlling the level of noise cancelling and/or noise masking as a function or speech uttered in the vicinity of the user. For example, a user wearing the headphones 102 while travelling in an airplane may listen to music with the noise cancelling turned up to a maximum level. However, the user may still want to be able to hear announcement made on the airplane's public address system or a flight attendant calling out to the user. In an aspect, the noise cancelling circuitry may be configured to reduce the noise cancelling levels when the headphone's microphones 114 detect speech uttered in the vicinity of the user (or when the user's name or another trigger word is spoken) so that the user is able to hear any announcements or people wanting to talk to the user.

In an aspect, one of the sound management capabilities includes controlling the equalization applied to the audio output at the headphones 102. For example, a level of boost or cut applied to the bass, mid-range, and/or treble frequencies may be configured.

In an aspect, one of the sound management capabilities includes controlling the level of noise cancelling and/or noise masking as a function of a geolocation of the user and optionally based on what the user is looking at or the direction in which the user is looking, and/or information collected using a sensor and/or camera disposed on the headphones 102 or in communication with the headphones. For example, the user device 104 may be configured to playback AR sounds on the headphones based on a geolocation of the user wearing the headphones 102 and optionally the direction in which the user is looking. For example, the user wearing the headphones may be walking around a tourist attraction. As the user is walking, an AR application running on the user device 104 may be configured to receive geolocation information of the user (e.g., from the headphone's geolocation circuitry or the user device's own geolocation circuitry) and stream audio information related to the location of the user. For example, if the user is near a historical building, audio information relating to the history or the building is streamed to the user's headphones. Further, movement detection circuitry (e.g., an accelerometer, gyroscope and/or magnetometer) may detect what the user is looking at (e.g., based on detecting the direction in which the user is looking) and audio related to what the user is looking at is streamed to the user's headphones 102. It may be desirable to increase or decrease noise cancelling and/or noise masking during the delivery of AR sounds to the wearer. For example, it may be desirable to increase noise cancelling or noise masking when AR sounds are delivered to the wearer to enable the wearer to hear the AR sounds more clearly.

In certain aspects, the user device 104 may provide the user with access to several types of audio content and services. For example, as shown in FIG. 1, the user may have access to one or more audio streaming services 106 (e.g., Pandora, Spotify, Amazon music, Google music, etc.) over the internet 112. The user may further have access via the internet 112 to other partner or third party services 110 (e.g., wellness services or map services such as Google maps, Apple maps, etc.) that include audio content. In an aspect, the user may have access to other services over the internet that provide other types of audio content including masking sounds, ambient soundscape sounds, AR content etc. The user may also have access via the internet 112 to cloud services 108. In an aspect, at least a portion of the processing related to implementing one or more of the sound management capabilities may be performed using the cloud 108. For example, one or more of the third party services 110 may have access to one or more of the sound management capabilities discussed above via the cloud 108. Further, the user may store audio content in the cloud 108 and stream audio from the cloud 108. In an aspect, the user device 104 may have one or more software applications installed providing access to the audio stream services 106, cloud services 108 and third party services 110.

In an aspect, some of the audio content the user has access to may be stored locally at the user device 104. For example, the user may download audio content from the internet or another user device and store the downloaded content in an internal memory of the user device.

In certain aspects, the user device 104 may provide access to one or more personal voice assistants to the user. For example, the voice assistants include but are not limited to Google Assistant, Amazon Alexa, Apple Siri etc.

It may be noted that any audio output device including out-loud audio output devices that support one or more of the sound management capabilities may be used in place of the audio headphones 102 in the system 100. For example, the audio output device may be a wearable audio device, such as a headset, in-ear earbuds, over-the-ear earphones, open-ear audio devices, audio eyeglasses, or a device configured to be worn over the shoulders of the user or otherwise on the user's body. Further, any device having a user interface and capable of running software applications and having communication capabilities similar to a smartphone or tablet device may be used as the audio output device 104 in system 100.

In certain aspects, the user device 104 may be configured to enable the user to create, manage and launch customized audio experiences by using different combinations of the sound management capabilities, audio content and other services available to the user. In an aspect, the user device 104 may provide the user with a single user interface for easily accessing the different sound management capabilities, audio content and services, for creating, managing and launching the customized audio experiences.

Figure 2:
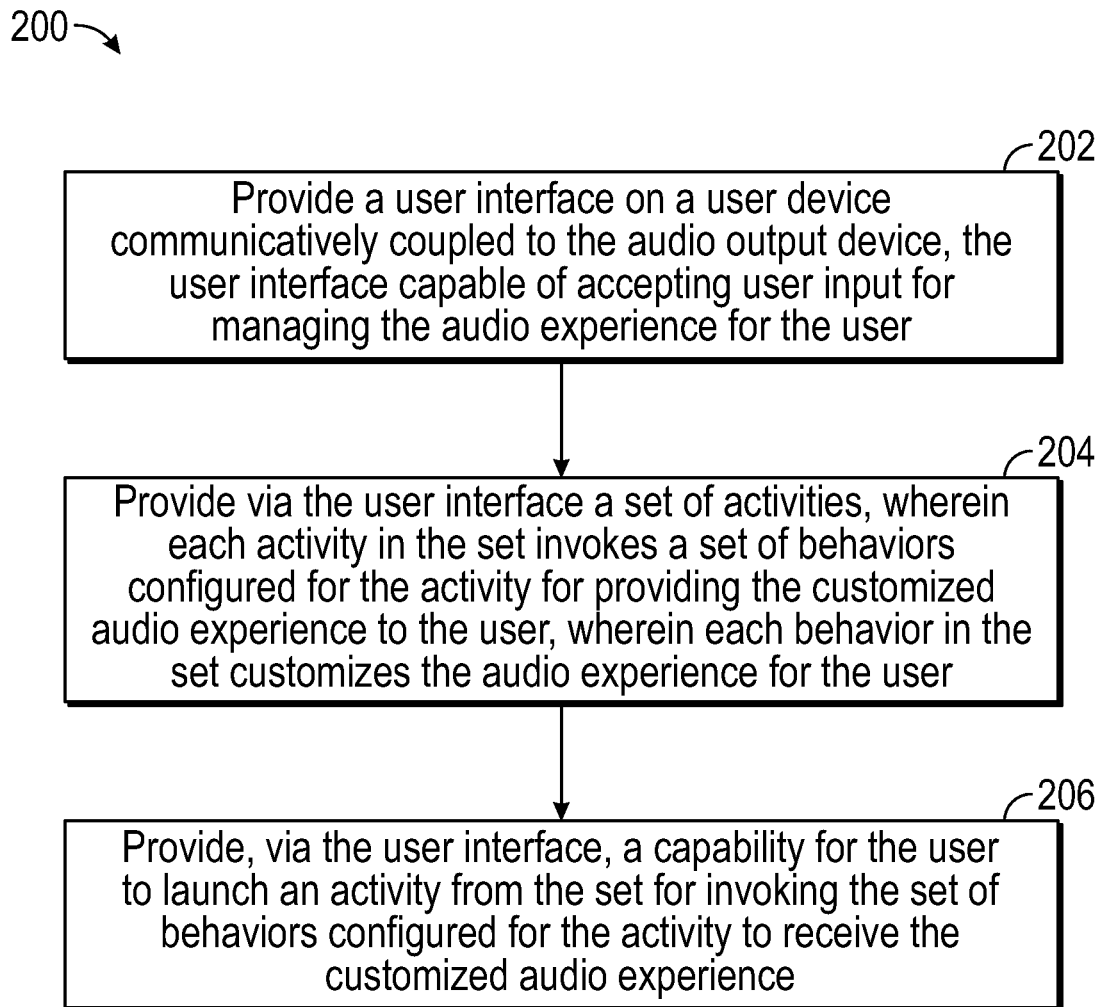
FIG. 2 illustrates example operations for providing a customized audio experience to a user of an audio output device.

FIG. 2 illustrates example operations 200 for providing a customized audio experience to a user of an audio output device (e.g., headphones 102 of FIG. 1).

Operations 200 begin, at 202, by providing a user interface on a user device communicatively coupled to the audio output device, the user interface capable of accepting user input for managing the audio experience for the user. In an aspect, the user device is the user device 104 of FIG. 1.

At 204, a set of activities is provided via the user interface, wherein each activity in the set invokes a set of behaviors configured for the activity for providing the customized audio experience to the user, wherein each behavior in the set customizes the audio experience for the user.

At 206, a capability is provided via the user interface for the user to launch an activity from the set for invoking the set of behaviors configured for the activity to receive the customized audio experience. The capability for the user to launch an activity from the set could include interaction through a voice interface, a spatial audio carousel, gesture controls (e.g., head nods or shakes), contextual triggers that automatically result in an activity launching, geolocation, a hardware-based user interface (e.g., a capacitive touch user interface, a rotary knob, a user input button or other control) on the headphones 102 or other wearable audio device or a peripheral wearable device (e.g., smart watch, ring, bracelet), or a graphical user interface (GUI) on the user device 104 or a peripheral wearable device (e.g., smart watch). In aspects, headphones 104 automatically launch an activity from the set for invoking behaviors. For example, the headphones use information collected from sensors and/or cameras on the headphones and/or the user device to determine the user's environment or otherwise trigger an activity.

As described in more detail below, in an example, the headphones prompt the user if a specific activity should be enabled based on the user's environment. Over time, the headphones learn the user's behavior. In response to being in a certain location and enabling a specific activity a number of times, the headphones prompt the user if the specific activity (e.g., gym activity) should be enabled the next time the user is determined to be in the specific location (e.g., workout facility). In another example, the user repeatedly enables the commute activity between a specific one hour period of time most days of the week. After identifying this pattern, the headphones ask the user if the commute activity should be enabled when the headphones are determined to be on the user's body during this one hour period of time. In this manner, an activity is automatically launched based on the user's input and learned behaviors.

In an aspect, an activity is defined by the set of behaviors configured for the activity. In an aspect, a behavior may correspond to a sound management capability, an audio content, a geolocation service, a voice assistant service, or any other service available to the user via the user device. In an aspect, different combinations of behaviors and behavior settings may be configured for different activities. The user may configure different combination of behaviors and behavior settings for different activities to create personalized, customized activities. Additionally or alternatively, the user may select activities from an activity marketplace as described, for example, with reference to FIG. 4. Selecting pre-configured activities associated with preprogrammed behaviors help allow a user to experience features of the headphones 102 without necessarily understanding all of the features and technology the headphones enable.

While working in an office, the user wearing the headphones may want to listen to music that helps the user focus, may want external noises to be attenuated, and may still want to hear certain sounds including other people calling out to the user, the phone ringing etc. For this example, the user may create or define a work activity and configure a set of behaviors for the activity to implement his/her choices. For example, the user may select a particular music playlist of the user's choice as a first behavior, set a desired level of noise cancellation or noise masking as a second behavior, and select and/or configure the sounds/speech the user wants to be interrupted with as a third behavior. Once the activity and corresponding behaviors are configured, the activity may be launched by the user to invoke the configured behaviors. For example, the user may launch the work activity when starting to work which in turn invokes the first, second and third behaviors configured for the activity. For example, when the work activity is launched, the user selected playlist starts playing, the noise cancelling is set to the user defined level, and the system starts monitoring configured sounds/speech and interrupts the noise cancelling when a configured sound/speech is detected. Additionally or alternatively, the user may configure a trigger criterion for a particular activity. For example, the user may select the geolocation service as an additional behavior for the work activity and further configure the geolocation behavior to trigger the work activity when the user is within one mile (or some predefined distance) of the user's work place. For example, the user device may continually monitor the device's geolocation (e.g., GPS location) and when the device is within one mile of a particular geolocation pre-configured as the user's work place, the device may provide the user with a prompt on the device to launch the work activity. In addition to a work activity, the user may configure or select other activities including, for example, an airplane activity, focus activity, commute activity, and gym activity.

In addition to configuring behaviors, each activity may allow a user to set-up or access shortcuts and notification settings that are specific to a given activity. A user's interaction with the headphones may output information based on the selected activity. In aspects, the user interaction is any user input that can be received by the headphones. Examples of user inputs include verbal, touch, haptic, and gesture inputs. In an example, a user interface on the headphones is repurposed to access a shortcut or provide a notification based on the selected activity. As an example, a button on the headphones is typically pressed to output the amount of charge remaining in the battery. During the gym activity, pressing that button provides an indication of the user's next exercise of a workout routine. During the work activity, pressing that button provides a notification that may be more relevant to the work activity. For example, the user configures pressing the button to provide an indication of the sender or subject of the user's last-received email or the user's next meeting time and topic.

In an aspect, the user interface (UI) includes a set of GUI screens provided by a single software application installed on the user device 104. In an aspect, the application includes several features designed to enable the user to create, manage and launch customized audio experiences. In an aspect, the software application provides access to the various sound management capabilities, customizable features, and audio content and services in a consolidated easy to use manner allowing the user to configure these as behaviors in desired combinations for various defined activities with relatively little effort.

Figure 3:
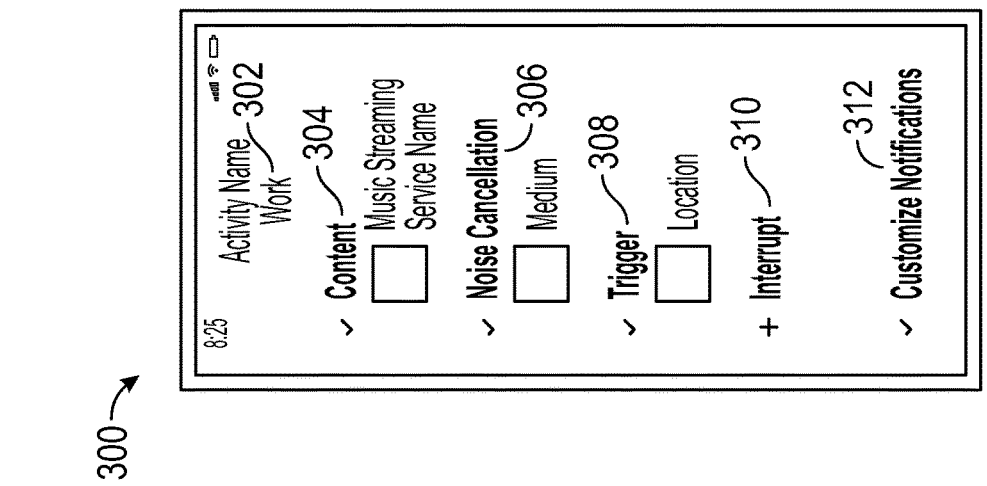
FIG. 3 illustrates an interface screen as displayed on a user device showing an example activity, in accordance with certain aspects of the present disclosure.

FIG. 3 illustrates an interface screen 300 as displayed on a user device (e.g., user device 104) showing an example activity, in accordance with certain aspects of the present disclosure. In an aspect, the interface screen 300 is a GUI and is part of the user interface provided by the software application installed on the user device as discussed above. Interface screen illustrates the example configured work activity 302 discussed in the above paragraphs as seen by the user. As shown, the work activity 302 includes a number of configured behaviors including content 304, Noise cancellation settings 306 (which may correspond to different noise cancellation settings, ranging from full awareness/no noise cancellation to full noise cancellation, and multiple levels in between), trigger 308 and interrupt 310. As shown, the content 304 is set to play music using an audio streaming service such as "Spotify". In an aspect, the Noise cancellation settings 306 refer to a volume of sounds external to the headphone. For example, a high noise cancellation setting corresponds to a low volume of external sounds and vice versa. As shown, the noise cancellation setting is set at a medium level, meaning a moderate volume of external sounds. The interrupt 310 refers to the ability to interrupt the noise cancelling and/or noise masking (e.g., reduce levels of noise cancelling and/or noise masking) when configured sounds or speech are detected. In an aspect, the user may configure the particular sounds and/or speech that will interrupt the noise cancelling and/or noise masking on a different user interface screen. The trigger 308 corresponds to one or more criteria that are to trigger the work activity. As shown, the trigger 308 is set to trigger the work activity 302 when it is detected that the user device is within one mile of a particular pre-configured geolocation (e.g., user's work place address). As discussed, when the user device is detected to be located within one mile of the pre-configured geolocation, the user is prompted (e.g., via the user interface on the user device or via sound notifications on the headphones) to launch the work activity 302. In addition, the work activity 302 may include a setting for selecting a voice assistant (e.g., Google Assistant, Amazon Alexa, Apple Siri, etc.) to be active during the work activity, if any.

In aspects, the interface screen 300 provides a way to customize repurposing a user interface on the headphones to provide a notification specific to a given activity. In an example, pressing a button on the headphones typically outputs the remaining battery life of the headphones. To repurpose that button for a given activity, the user selects customize notifications 312 on the interface screen 300. The user is then presented with a list of outputs that may be associated with pressing the button on the headphones. The user selects a desired notification to be output when the user presses the button while in the activity.

In certain aspects, the software application may provide the user access to pre-configured activities, for example, via an activity marketplace.

A gym activity may be triggered when the user's location indicates the user is at a gym. The gym activity may provide a workout playlist that is personalized based on the user's profile, so the headphones output the type of music the user likes to hear while working out.

An airplane activity may be triggered when a sensor on the headphones or user device determines the user is on an airplane. In an example, the background noise and/or location services may indicate the user is on an airplane. In an example, the user arrives at the airport and enables an "airplane mode" on the user device. In response to enabling the "airplane mode" on the user device 104, the headphones 102 may output a verbal prompt asking the user if the user would like to enable the airplane activity on the headphones. Based on historical usage, the headphones may automatically switch to an airplane activity when the user is determined to be on an airplane. In an example, after affirmatively choosing to enter the airplane activity after a configurable or set number of times (e.g., two or more), the headphones may ask the user if the airplane activity should be automatically enabled the next time the user is determined to be at the airport. If the user agrees, the headphones will automatically enable the airplane activity when the user is at the airport (e.g., without a verbal prompt). In the airplane activity, the headphones may activate noise cancellation to block out airplane noises and enter an aware mode when an announcement is made or when an individual in the use's vicinity utters the user's name.

A commute activity may be triggered when the user is determined to be walking, sitting, or in a mode of transport. The commute activity may balance blocking external noises while allowing the user to be aware of the environment around the user. In aspects, the commute activity plays the user's favorite podcast.

In aspects, the application allows the user to create a customized, prioritized list of source devices for the headphones to establish wireless connections with based on the activity. Customizing prioritized lists of sources devices to connect to may replace the functionality of headphones automatically connecting to the most recently used user device in the headphone's paired device list. In an example, at least one option on the interface screen 300 enables a user to prioritize or order source devices to connect to (e.g., pair with) based on the activity. In the work activity, the user may prioritize connections to "work laptop" followed by "tablet." If "work laptop" is not available, the headphones may connect to the "tablet." In the home activity, the user may prioritize connections to devices at the user's house. In an example, the user prioritizes connections to "soundbar." In the commute activity, the user prioritizes connections to "smartphone." When the user switches between activities, the headphones automatically and seamlessly connect to one or more source devices based on the prioritized list associated with the activity.

In addition to configuring source devices for the headphones to connect to in an activity, in aspects, the application also allows the user to identify devices which the headphones should avoid establishing a wireless connection with in a given activity. In the work activity, a user may want the headphones to connect to "work laptop" and may not want the headphones to connect to "smartphone" such that incoming phone calls do not interrupt video conferences conducted through the "work computer." In another example, in the focus activity, a user may not want the headphones to connect to "smartphone" in an attempt to reduce disruptions and allow the user to focus on a current task.

Figure 4:
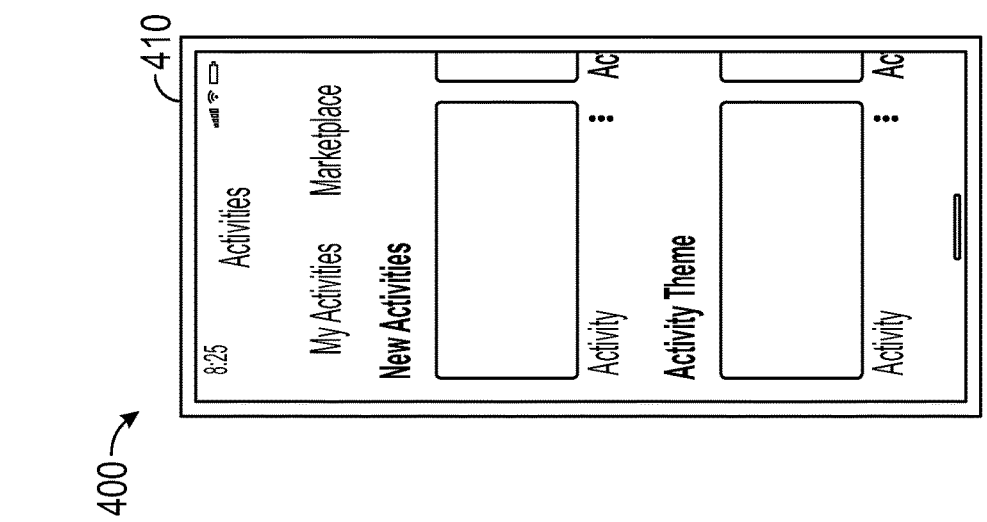
FIG. 4 illustrates examples interface screens of an activity marketplace, in accordance with certain aspects of the present disclosure.

FIG. 4 illustrates examples interface screen 410 of an activity marketplace, in accordance with certain aspects of the present disclosure. As shown in interface screen 410, the activity marketplace may organize the activities in different categories to make it easier for the user to find a desired type of activity. For example, the categories of activities include work related activities, travel related activities, workout related activities, commute related activities and the like. Additionally or alternatively, as shown in interface screen 410, the user may be suggested newly added and/or popular activities under a "New Activities" category. In an aspect, the activities displayed to the user on a home screen of the activity marketplace in one or more categories are selected based on the user preferences and/or habits. For example, the software application tracks the activities viewed and used by the user and selects the activities displayed on the home screen of the activity marketplace based on the types of activities frequently viewed and/or used by the user. In an aspect, each pre-configured activity comes with a set of configured behaviors. In an aspect, the user has an option to customize the behaviors configured for a pre-configured activity in order to customize the activity to the user's preferences. The customization may include adding or deleting configured behaviors or change settings for a particular behavior. In an aspect, the marketplace interface screen may provide the user with an option to either launch an activity or save the activity to the user's activity play list. Additionally or alternatively, the activity marketplace may include a section displaying the user's activity play list (not shown) including the activities already added by the user to the user's activity play list.

In certain aspects, the user may view information about a particular activity displayed in the marketplace by selecting the activity. For example, when the user selects an activity displayed in the marketplace, the user is taken to another interface screen providing additional information about the selected activity.

Figure 5:
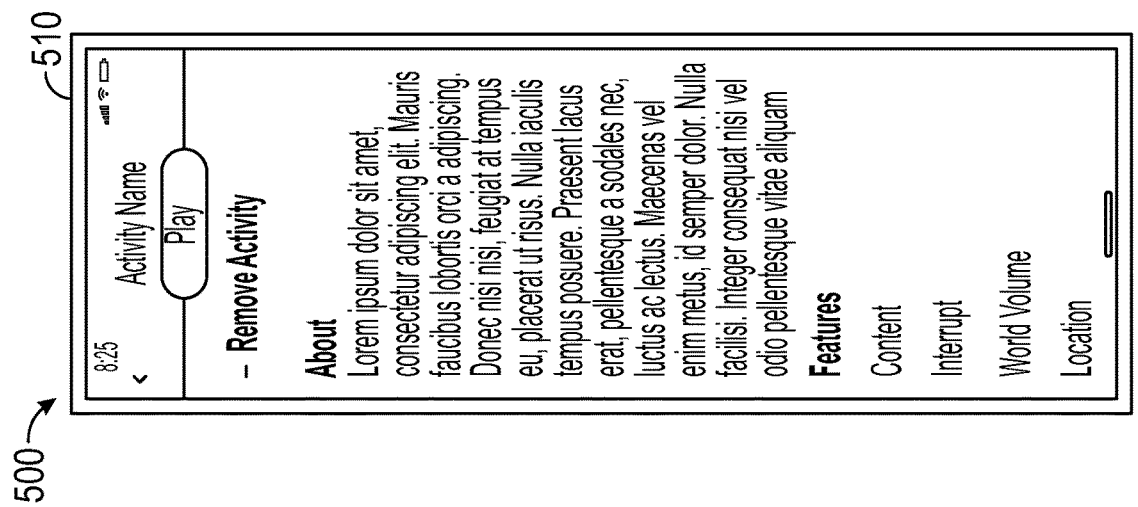
FIG. 5 is an illustration of interface screens showing information relating to individual pre-configured activities, in accordance with certain aspects of the present disclosure.

FIG. 5 is an illustration 500 of an interface screen 510 showing information relating to individual pre-configured activities, in accordance with certain aspects of the present disclosure. As shown, interface screen 510 displays information regarding a particular activity. Example activities include: commute, work, run, exercise, explore, bike, office, focus, airplane, home, and grocery. In an aspect, an activity displayed in the interface screens 510 may be a pre-configured activity. As described in the above paragraphs, a user may select an activity from the activity marketplace to display the interface screen 510 to view additional information about the selected activity. In an aspect, the interface screen 510 includes information regarding a source of the pre-configured activity. In an aspect, the source includes the name of the company or service that created the pre-configured activity. The interface screen 510 further includes a name of the activity and a brief description of the activity including behaviors configured for the activity. Additionally or alternatively, the interface screen 510 includes options for launching the activity and/or saving the activity to the user's activity playlist.

In certain aspects, the software application may provide an interface for the user to create new activities. The interface may allow the user to create a new activity and name the new activity. Further, the interface may provide a list of sound management capabilities, audio content and services selectable by the user to configure as behaviors for the new activity. Additionally, the user may customize each configured behavior. For example, the user may be provided with a list of music sources including locally stored music and several free and/or subscribed music streaming services such as Pandora, Spotify, Google Music, Amazon Music and the like. The user may select one of the music services as a behavior and then customize the behavior by selecting a particular playlist. Additionally or alternatively, the user may be presented via the user interface a list of sound management capabilities including external sound volume (e.g., noise cancellation 306 in FIG. 3), interruption by uttered speech or sound (e.g., interrupt 310 in FIG. 3), adaptive audio volume based on external sounds, noise cancelling, noise masking etc. The user may select the external sound volume capability as a behavior and then customize the behavior by setting a desired volume for the external sounds. Additionally or alternatively, the user may be presented with a list of voice assistants such as Google Assistant, Amazon Alexa, Apple Siri or the like. The user may select one of the voice assistants as a behavior. For example, when defining a driving activity the user may configure Google Assistant as a behavior so that the user may use Google Maps with voice commands. Similarly, user may be provided with other capabilities and services selectable via the user interface to configure as behaviors for activities.

In certain aspects, the software application may provide an interface for the user to customize activities to suit user preferences.

Figure 6:
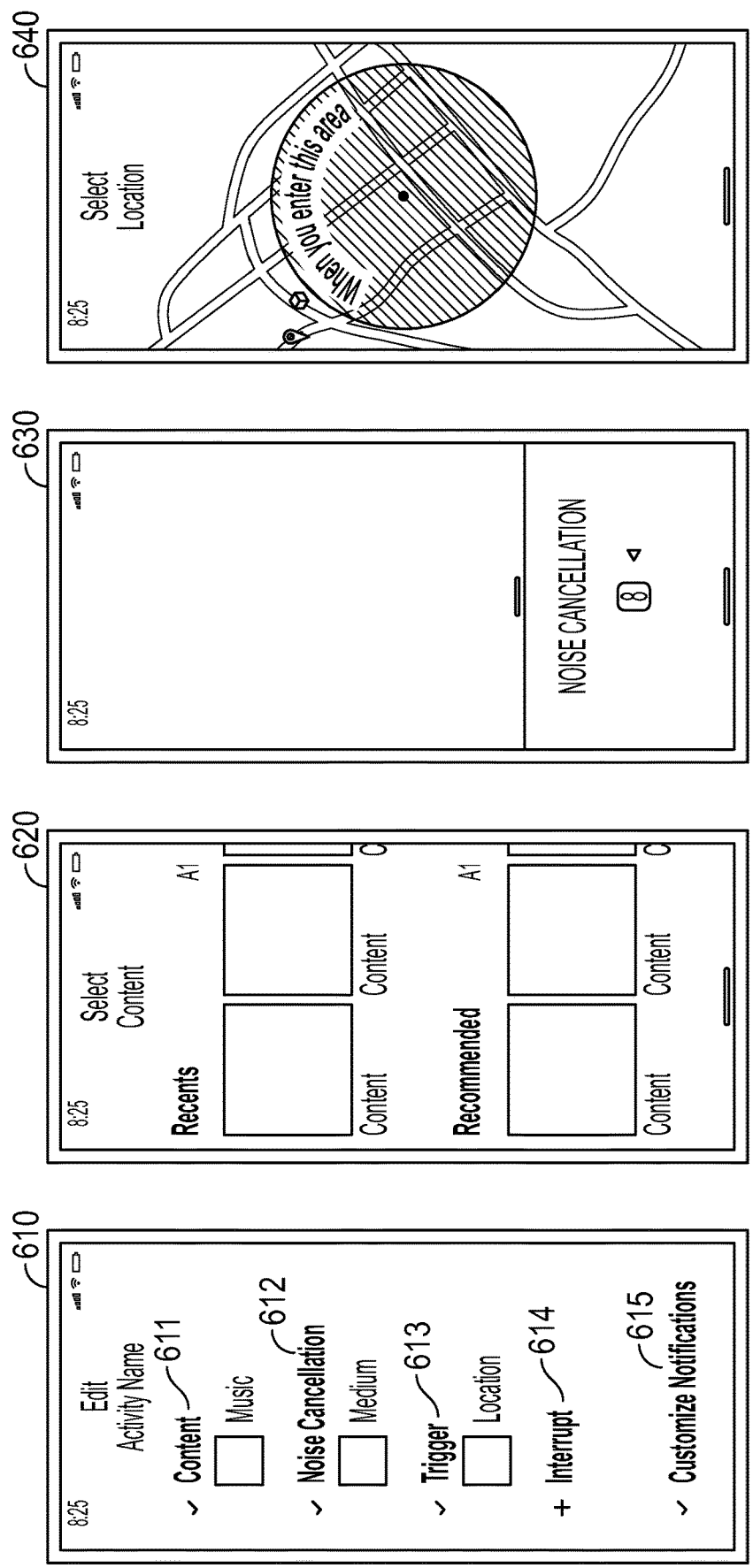
FIG. 6 illustrates interface screens that may be used for customizing an activity, in accordance with certain aspects of the present disclosure.

FIG. 6 illustrates interface screens that may be used for customizing an activity, in accordance with certain aspects of the present disclosure. Interface screen 610 displays an edit interface for an activity. In an aspect, the user may select an activity for editing from the activity marketplace (e.g., as shown in FIG. 4), from the user's activity playlist, from the screen displaying additional information relating to a particular activity, while creating a new activity or in any other foreseeable manner. In an aspect, the user may select an activity for editing from the edit screen. For example, the edit interface screen 610 provides a list of activities and the user may select an activity from the list to edit. As shown in FIG. 6, once an activity is selected for editing, the behaviors currently configured for the activity are displayed in the edit interface screen 610. As shown, the edit interface screen 610 displays four behaviors configured for an activity selected for editing including, the behaviors including "content" 611, "noise cancellation" 612, "trigger" 613, "interrupt" 614 and "customize notifications" 615. These behaviors are similar to the behaviors content 304, noise cancellation 306, trigger 308, interrupt 310, and customize notifications 312 described in the above paragraphs with reference to FIG. 3. Additionally or alternatively, the user may be presented with a list of voice assistants such as Google Assistant, Amazon Alexa, Apple Siri or the like. The user may select one of the voice assistants as a behavior.

The user may customize each of the behaviors "content" 611, "noise cancellation" 612, "trigger" 613, "interrupt" 614, and "customize notifications" 615 configured for the activity selected for edit in the edit interface screen 610. In an aspect, to customize a particular behavior displayed in the edit interface screen 610, the user may select the behavior to open another interface screen designed to customize the selected behavior. For example, interface screen 620 may be used to customize the content 611, interface screen 630 may be used to customize the noise cancellation 612, and the interface 640 may be use to customize the trigger 613.

In an aspect, the interface screen 620 provides the user with several options for customizing the audio content 611. In an aspect, the interface screen 620 may provide the user with a list of audio content classified under different categories for easy selection by the user. For example, the displayed audio content includes audio playlists from different audio streaming services, masking sounds, AR content, and other audio content provided by various other services accessible to the user.

In an aspect, the interface screen 630 allows the user to manually set the volume of sounds external to the headphones by setting a level of noise cancellation.

In an aspect, the interface screen 640 allows the user to select a geolocation on a map for setting as a trigger for the activity. Many types of triggers could be used for launching an activity other than proximity to a geolocation. For example, potential triggers include: time of day, microphone pick-up or ambient volume level, proximity to a particular type of geographic location (e.g., green space, beach, sporting venue, casino, etc.), weather, demographic information (e.g., population zones, marketing or census data), speed, inferred activity type (e.g., exercising, meditating, etc.), proximity to other users, other user devices, or social media connections, celestial events (e.g., meteor shower, blood moon, etc.), breaking news, popularity of an activity, recognition of particular user patterns (e.g., commuting patterns, exercise patterns, etc.), schedule (e.g., recognizing patterns, accessing a calendar using a software application, etc.), detected emotion/mood, detected parameter related to health, beacons, and state of the user device (e.g., in silent mode, airplane mode).

In certain aspects, the user may launch configured activities in a number of ways. In an aspect, the software application installed on the user device may allow the user to select and launch configured activities. In an aspect, activities that were provided or created using a third party application on the user device may be launched via the third party application. In an aspect, when at least one trigger criterion is configured for a particular activity, the user may be prompted to launch the activity when the at least one trigger criterion is satisfied. This prompt may be provided via the user device or the audio output device. The prompt on the user device may be a visual prompt selectable by the user to launch the activity. The prompt on the audio output device may be an audio prompt such as a sound (e.g., a ding, bell etc.) or a voice informing the user that the activity is ready to launch. Once prompted, the user may launch the activity from the audio output device, for example, by pressing a button on the audio output device. In an aspect, the user may configure the activity to launch automatically without user input when at least one trigger criterion is satisfied.

In an aspect, the software application may allow the user to configure a quick launch list of activities for easy launch via the audio output device.

Figure 7:
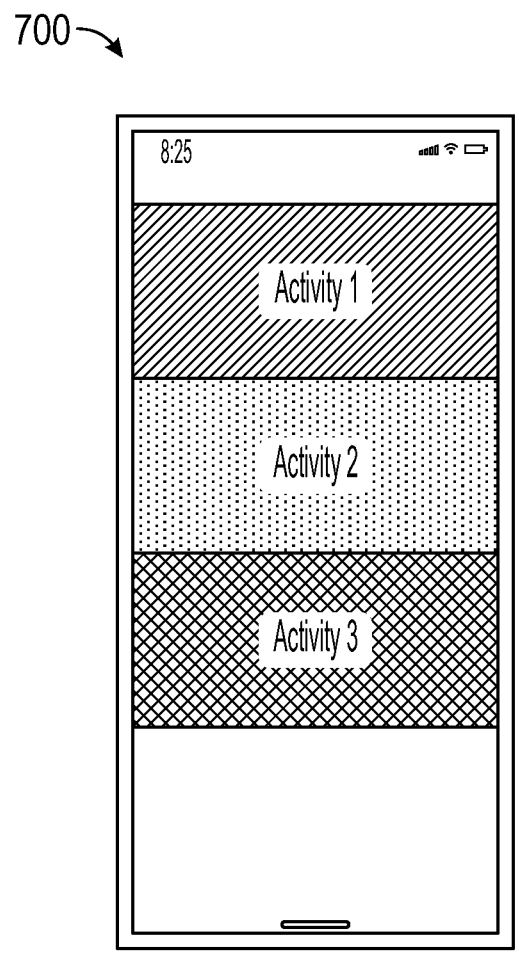
FIG. 7 illustrates an interface screen showing a quick launch list of activities, in accordance with certain aspects of the present disclosure.

FIG. 7 illustrates an interface screen 700 showing a quick launch list of activities, in accordance with certain aspects of the present disclosure. As shown, the quick launch list includes three different activities. The user may add any configured activity to one of the three positions in the quick launch list. In an aspect, the user may configure each position in the quick launch list with a button on the audio output device and may launch an activity added to a particular position in the list by pressing the button configured for the position.

In an aspect, the user may use one or more buttons to browse through the activities in the quick launch list and then launch a particular activity from the list. For example, the user may browse through the list by pressing a button on the audio output device, wherein each press of the button announces the name of an activity from the list. The user may then press the same button or a different button on the audio output device after an announced activity to launch the activity. Additionally or alternatively, the user may use a spatial audio carousel to browse through the activities in the quick launch list and then launch a particular activity from the list using a head gesture, as described in U.S. patent application Ser. No. 15/908,183, entitled "Directional Audio Selection", filed on Feb. 28, 2018, the entire contents of which are incorporated herein by reference.

In an aspect, the software application may be configured to suggest activities (e.g., via the user interface on the user device or by sending voice suggestions on the audio output device) based on certain detected parameters. For example, the suggested activities may be based on a geolocation of the user, external noise levels, time of day, weather, bio-metrics of the user, user habits, user preferences or the like. For example, the user may be suggested a "Work" related activity at 9 am on Mon-Fri. In another example, activities may be suggested based on user's geographic location when the user is detected at home, work, gym, train station or the like.

In the preceding, reference is made to aspects presented in this disclosure. However, the scope of the present disclosure is not limited to specific described aspects. Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams may represent a module, segment or portion of code, which comprises one or more executable instructions for implementing the specified logical function(s). In some implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The invention claimed is:

1. A method of customizing a set of activities for a wearable audio device, the method comprising:
   providing a user interface on a device communicatively coupled to the wearable audio device, the user interface capable of accepting user input for customizing the set of activities;
   providing, via the user interface, a capability for a new activity to be added to the set of activities;
   providing, via the user interface, multiple options for customizing a noise cancelling level for the wearable audio device for each activity in the set of activities;
   providing, via the user interface, a capability to select any activity from the set of activities to be enabled on the wearable audio device; and
   providing, via the user interface, a capability to create a prioritized list of source devices the wearable audio device should establish a wireless connection with for each activity in the set of activities.

2. The method of claim 1, further comprising, providing, via the user interface, multiple options for customizing an audio equalization applied to audio output at the wearable audio device for each activity in the set of activities.

3. The method of claim 1, wherein the capability to create a prioritized list of source devices the wearable audio device should establish a wireless connection with for each activity in the set of activities includes a capability to identify one or more source devices the wearable audio device should avoid establishing a wireless connection.

4. The method of claim 1, further comprising, providing, via the user interface, multiple options for customizing a shortcut for each activity in the set of activities, wherein the shortcut is accessed from user input at the wearable audio device.

5. The method of claim 1, further comprising, providing, via the user interface, a capability to change notification settings for each activity in the set of activities.

6. The method of claim 1, further comprising, providing, via the user interface, a capability to change an initial audio content playable by the wearable audio device for each activity in the set of activities.

7. The method of claim 6, wherein audio content options for the initial audio content includes audio playlists from one or more audio streaming services.

8. The method of claim 6, wherein audio content options for the initial audio content includes multiple noise masking sounds.

9. The method of claim 1, further comprising, providing, via the user interface, multiple options for customizing a loudness of sounds external to the wearable audio device for each activity in the set of activities.

10. The method of claim 9, wherein customizing the loudness of sounds external to the wearable audio device for each activity in the set of activities includes selecting a volume level of the external sounds to be played by the wearable audio device.

11. The method of claim 1, further comprising, providing, via the user interface, a capability to change whether a detected sound or speech interrupts noise cancelling at the wearable audio device.

12. The method of claim 1, further comprising, providing, via the user interface, a capability to change whether a loudness of audio content played by the wearable audio device is adapted based on a loudness of sounds external to the wearable audio device.

13. The method of claim 1, further comprising, in response to selection of an activity from the set of activities to be enabled on the wearable audio device, a name of the activity is announced at the wearable audio device.

14. The method of claim 1, further comprising, in response to an addition of a new activity to the set of activities, providing, via the user interface, a capability for assigning a name to the new activity.

15. The method of claim 1, wherein the wearable audio device includes a capability to select a different activity from the set of activities to be enabled on the wearable audio device.

16. A non-transitory computer-readable medium storing instructions which when executed by at least one processor performs a method of customizing a set of activities for a wearable audio device, the method comprising:
   providing a user interface on a device communicatively coupled to the wearable audio device, the user interface capable of accepting user input for customizing the set of activities;
   providing, via the user interface, a capability for a new activity to be added to the set of activities;
   providing, via the user interface, multiple options for customizing a noise cancelling level for the wearable audio device for each activity in the set of activities;
   providing, via the user interface, a capability to select any activity from the set of activities to be enabled on the wearable audio device; and
   providing, via the user interface, a capability to create a prioritized list of source devices the wearable audio device should establish a wireless connection with for each activity in the set of activities.

17. The non-transitory computer-readable medium of claim 16, wherein the method further comprises, providing, via the user interface, a capability to customize one or more of the following for each activity in the set of activities: an audio equalization applied to audio output at the wearable audio device; a shortcut access from user input at the wearable audio device; notification settings; an initial audio content playable by the wearable audio device; a loudness of sounds external to the wearable audio device; whether a detected sound or speech interrupts noise cancelling at the wearable audio device; whether a loudness of audio content played by the wearable audio device is adapted based on a loudness of sounds external to the wearable audio device; or a name assigned to a given activity.

18. A method of customizing a set of activities for a wearable audio device, the method comprising:
   providing a user interface on a device communicatively coupled to the wearable audio device, the user interface capable of accepting user input for customizing the set of activities;
   providing, via the user interface, a capability for a new activity to be added to the set of activities;
   providing, via the user interface, multiple options for customizing a noise cancelling level for the wearable audio device for each activity in the set of activities;
   providing, via the user interface, a capability to select any activity from the set of activities to be enabled on the wearable audio device; and
   providing via the user interface, multiple options for customizing a loudness of sounds external to the wearable audio device for each activity in the set of activities,
   wherein customizing the loudness of sounds external to the wearable audio device for each activity in the set of activities includes selecting a volume level of the external sounds to be played by the wearable audio device.

19. The method of claim 18, wherein the capability to create a prioritized list of source devices the wearable audio device should establish a wireless connection with for each activity in the set of activities includes a capability to identify one or more source devices the wearable audio device should avoid establishing a wireless connection.

20. A non-transitory computer-readable medium storing instructions which when executed by at least one processor performs a method of customizing a set of activities for a wearable audio device, the method comprising:
   providing a user interface on a device communicatively coupled to the wearable audio device, the user interface capable of accepting user input for customizing the set of activities;
   providing, via the user interface, a capability for a new activity to be added to the set of activities;
   providing, via the user interface, multiple options for customizing a noise cancelling level for the wearable audio device for each activity in the set of activities;
   providing, via the user interface, a capability to select any activity from the set of activities to be enabled on the wearable audio device; and
   providing via the user interface, multiple options for customizing a loudness of sounds external to the wearable audio device for each activity in the set of activities,
   wherein customizing the loudness of sounds external to the wearable audio device for each activity in the set of activities includes selecting a volume level of the external sounds to be played by the wearable audio device.

* * * * *